(12) United States Patent
Hazlewood

(10) Patent No.: US 8,191,968 B2
(45) Date of Patent: Jun. 5, 2012

(54) RELEASE STRAP FOR A RECLINER MECHANISM OF AN AUTOMOTIVE VEHICLE SEAT ASSEMBLY

(75) Inventor: Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 308 days.

(21) Appl. No.: 12/617,799

(22) Filed: Nov. 13, 2009

(65) Prior Publication Data
US 2011/0115274 A1   May 19, 2011

(51) Int. Cl.
*B60N 2/02* (2006.01)
(52) U.S. Cl. ................ 297/378.12; 297/378.1
(58) Field of Classification Search ........... 297/378.1, 297/378.11, 378.12, 378.13, 378.14
See application file for complete search history.

(56) References Cited

U.S. PATENT DOCUMENTS

| | | | | |
|---|---|---|---|---|
| 3,891,272 | A | * | 6/1975 | Takada ................ 297/472 |
| 3,997,190 | A | * | 12/1976 | Seiffert et al. ............ 280/807 |
| 4,455,049 | A | * | 6/1984 | Martin ................. 297/378.12 |
| 4,750,655 | A | | 6/1988 | Barry |
| 5,039,168 | A | * | 8/1991 | Baymak et al. ........... 297/471 |
| 6,132,000 | A | * | 10/2000 | Tanaka ................ 297/378.13 |
| 6,749,264 | B2 | | 6/2004 | Jeong |
| 7,393,056 | B2 | | 7/2008 | O'Connor |
| 2002/0152669 | A1 | | 10/2002 | Harvanek |
| 2007/0062324 | A1 | | 3/2007 | Ingraham |
| 2008/0296951 | A1 | | 12/2008 | Goshima et al. |

* cited by examiner

*Primary Examiner* — Sarah B McPartlin
(74) *Attorney, Agent, or Firm* — Gifford, Krass, Sprinkle, Anderson & Citkowski, P.C.

(57) ABSTRACT

A seat assembly for an automotive vehicle having a release mechanism and a release strap for actuating the release mechanism is provided. The release mechanism is capable of moving a seat back from a seated position to a stowed position. The release strap includes an attachment portion having an attachment end which is fixedly secured to the release mechanism. A gripping portion allows an occupant to quickly and easily grasp and actuate the release strap. The release strap also includes an overlapping portion formed by overlapping a portion of the attachment portion and a portion of the gripping portion so as to present the gripping portion in an upward direction.

15 Claims, 3 Drawing Sheets

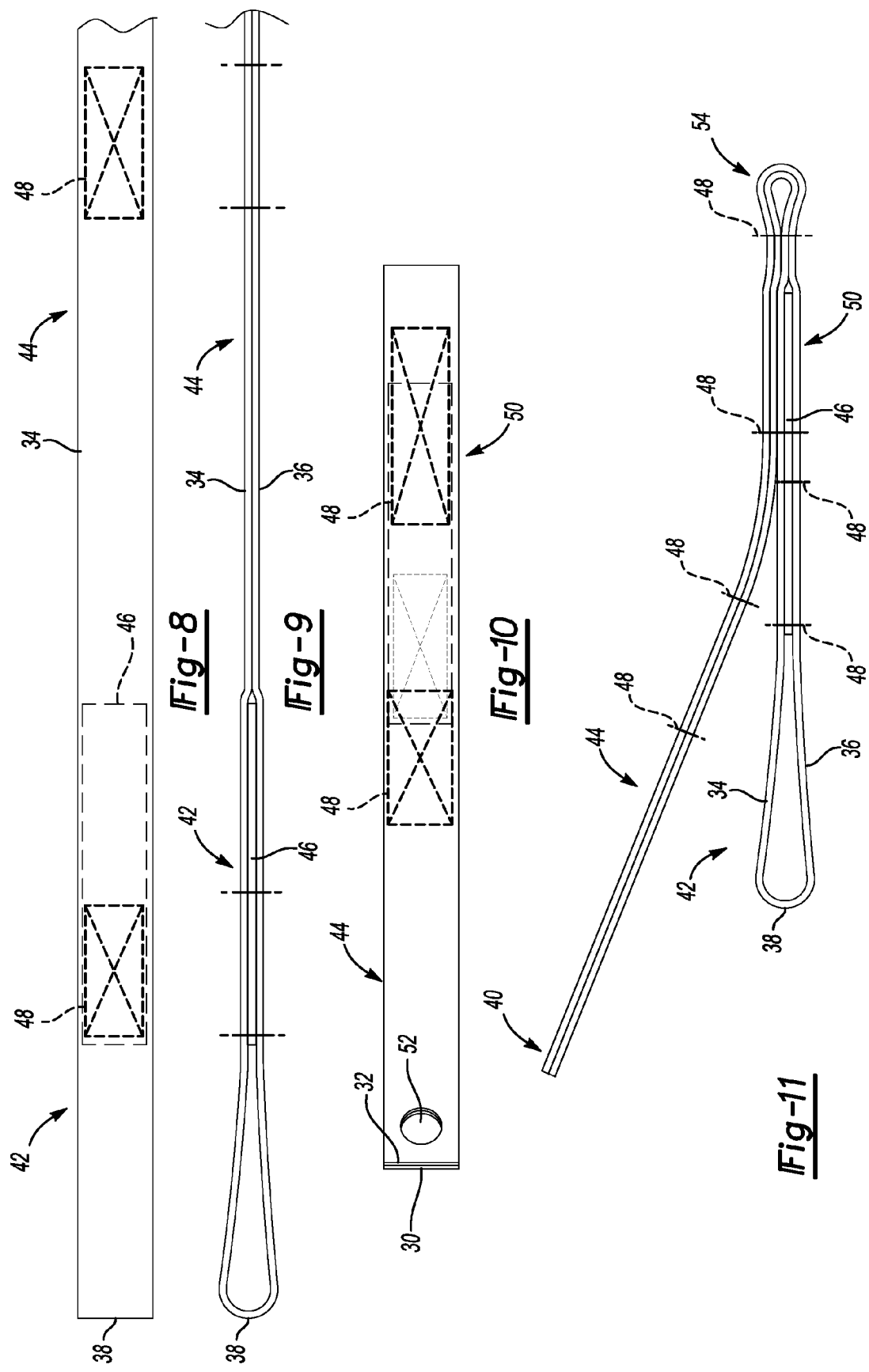

RELEASE STRAP FOR A RECLINER MECHANISM OF AN AUTOMOTIVE VEHICLE SEAT ASSEMBLY

FIELD OF THE INVENTION

The present invention relates generally to a seat assembly for an automotive vehicle, more particularly to a release strap for actuating a recliner mechanism of the seat assembly.

BACKGROUND OF THE INVENTION

Most modern automotive vehicles include seat assemblies having a recliner or release mechanism to pivotally move a seat back from a seated position to a stowed or walk-in position. The walk-in position allows a vehicle occupant access to a second row seating in coupes, or third row seating in vans, minivans, or SUVs. Consequently, most modern automotive vehicles employing release mechanisms which are capable of being actuated from behind by a seated occupant to allow the seated occupant to exit the vehicle.

It is known in the art to provide a release strap which extends from the rear of the seat assembly to allow a seated occupant to actuate the release mechanism of the seat assembly in front of them. A loop is commonly formed on the protruding end of the release strap so that an occupant may quickly and easily grasp the release strap with one or more fingers and actuate the release mechanism.

However, as the release strap is often located on a lower portion of the seat assembly adjacent the door, there are several drawbacks to this design. First, as the release strap is commonly made from a flexible material, usually a woven fabric, the release strap is not self-supporting and will droop downwardly. In this position the loop of the release strap is in the exit path of the occupant and presents a tripping danger to occupants during the sometimes awkward exit from the automotive vehicle as the occupant's shoe may become entangled with the loop. This danger is increased when the occupant is wearing sandals, open-toed shoes, pointed shoes, or if the occupant is barefoot.

In addition, the downwardly drooping position of the release strap can make it difficult for an occupant to quickly and easily grasp the loop. Specifically, the actuation point of the release strap, that is the point at which an occupant grasps the release strap, is in close proximity to the floor of the automotive vehicle which can be difficult for a seated occupant to reach. This problem is increased when the occupant lacks sufficient room to lean forward. Thus, there exists a need for an improved release strap which decreases the danger of an occupant being entangled with the loop portion during the exit of the vehicle and which allows an occupant to quickly and easily grasp the loop portion.

SUMMARY OF THE INVENTION

The present invention provides a release strap which overcomes the above-mentioned disadvantages of the previously known release strap designs.

In brief, a seat assembly for an automotive vehicle having a release mechanism and a release strap for actuating the release mechanism is provided. The release mechanism is capable of moving a seat back from a seated position to a stowed position. The release strap includes an attachment portion at one end of the release strap having an attachment end which is fixedly secured to the release mechanism. A gripping portion at an opposite end of the release strap which allows an occupant to quickly and easily grasp and actuate the release strap. The release strap also includes an overlapping portion formed by securing a portion of the attachment portion to a portion of the gripping portion at a first location so as to present the gripping portion in an upward direction.

In one embodiment the release strap is formed of a single piece of flexible material having a first end and a second end. The flexible material is folded such that a top strap overlies a bottom strap to form a loop at an end of the gripping portion, and where the first end and the second end overlie to form the attachment end of the attachment portion. The overlapping portion is formed by overlapping the top strap of a portion of the gripping portion with the top strap of a portion of the attachment portion.

BRIEF DESCRIPTION OF THE DRAWINGS

FIG. 8 is a top plan view illustrating the inventive release strap prior to being connected at the overlapping portion;

FIG. 9 is a side elevational view of the inventive release strap prior to being connected at the overlapping portion;

FIG. 10 is a top plan view of the inventive release strap; and

FIG. 11 is a side elevational view of the inventive release strap.

Advantages of the present invention will be readily appreciated as the same becomes better understood by reference to the following detailed description when considered in conjunction with the accompanying drawings.

DETAILED DESCRIPTION OF THE INVENTION

The present invention has utility as a release strap for use with an automotive vehicle seat assembly which overcomes the above-mentioned disadvantages. The inventive release strap provides a seated occupant of an automotive vehicle with the quick and easy ability to move the seat back of the seat assembly from a seated position into a stowed position by raising the actuation point of the release strap. Further, concerns over the danger of the occupant being entangled with the release strap are eliminated by raising the loop out of the exit path of the occupant.

Figure 1:
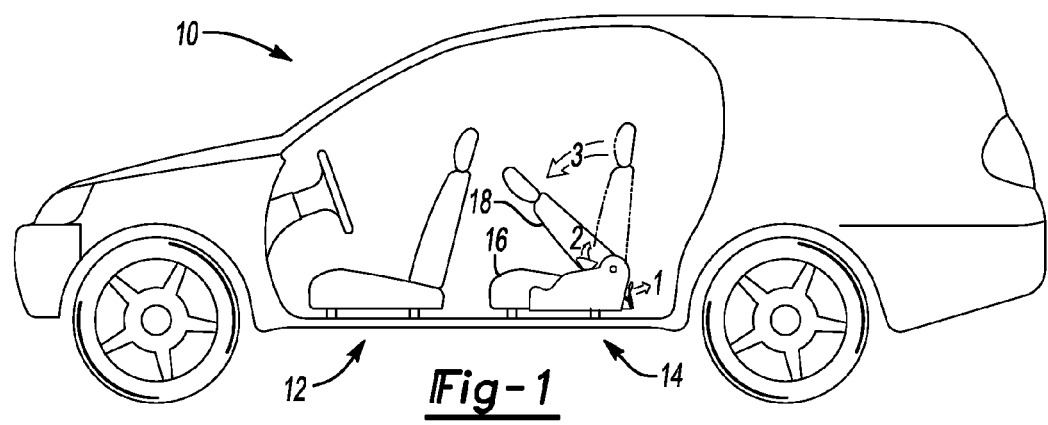
FIG. 1 is a side elevational view of an automotive vehicle having a seat assembly employing the inventive release strap.
Figure 2:
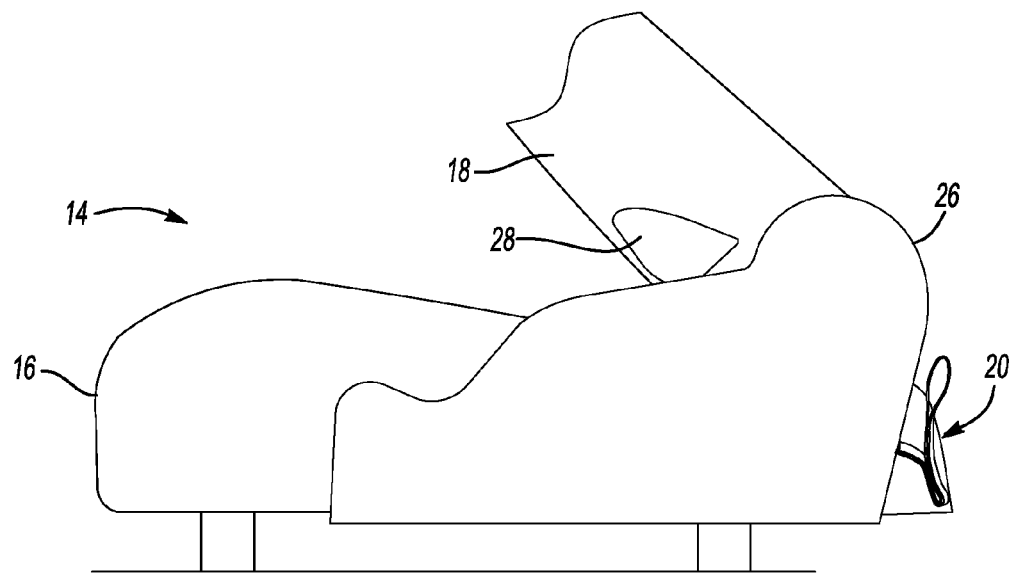
FIG. 2 is an enlarged partial view of the seat assembly with the inventive release strap.

Referring to FIG. 1, an automotive vehicle is generally indicated at 10. The automotive vehicle includes a passenger compartment 12 having a front row seating, including the driver's seat, a second row seating, and a third row seating (not shown) or additional cargo space. A seat assembly 14, located in the second row seating, includes a seat cushion 16 and a seat back 18 pivotally coupled to the seat cushion 16. The seat back 18 is pivotally moveable between a seated position, seen in ghost in FIG. 1, and a stowed position.

Figure 3:
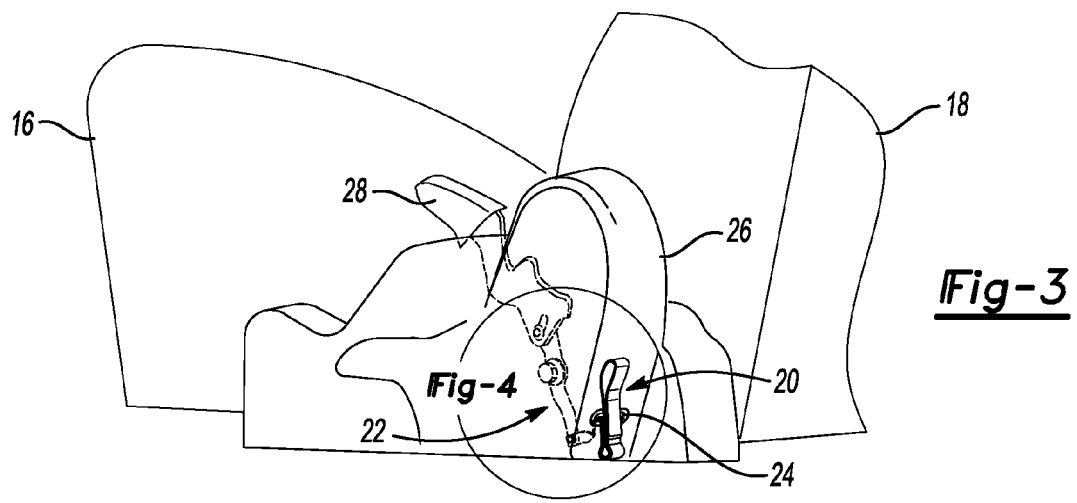
FIG. 3 is a side perspective view illustrating the release mechanism and the release strap.

To allow an occupant seated in the third row seating, or in the case of a two-door automotive vehicle the second row seating, to move the seat back 18 from the seated position to the stowed position, a release strap 20 extends from the rear of the seat assembly 14 on the side adjacent a door of the automotive vehicle 10. As seen in FIG. 3, the release strap 20 is secured to a release mechanism 22 and extends through a slot 24 formed in a shield 26 which covers the internal workings of the seat assembly 14 including the release mechanism 22. The release mechanism 22 is operatively attached to the seat assembly 14 to pivotally move the seat back 18 from a seated position to a stowed position.

Figure 4:
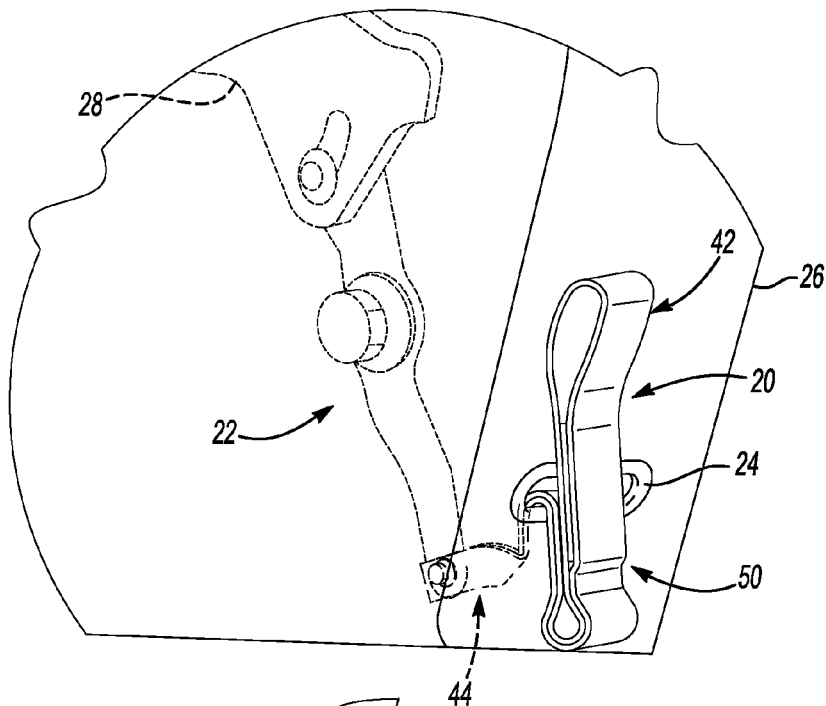
FIG. 4 is an enlarged view of the release mechanism and the release strap as shown in FIG. 3.

In the illustrated embodiment of FIG. 4 the release mechanism 22 links the release strap 20 to a recliner handle 28. As seen in FIG. 1, the actuation of the release strap 20, Arrow 1, actuates the recliner level 28, Arrow 2, which will pivot the seat back 18 from the seated position to the stowed position, Arrow 3. It is appreciated, of course, that the inventive release strap 20 is not limited to use with the illustrated release mechanism 22 and is capable of use with a variety of different release mechanisms. In addition, the release mechanism 22, optionally, moves both the seat back 18 and a seat cushion 16 from a seated position to a stowed position, or slides the entire seat assembly 14 forward on a rail system (not shown).

Figure 7:
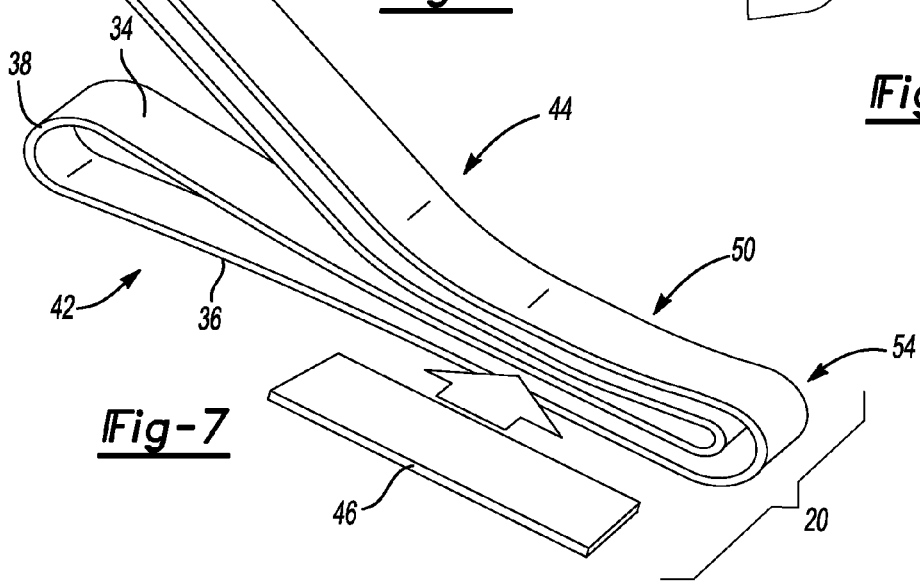
FIG. 7 is an exploded perspective view of the inventive release strap.

Referring to FIGS. 7-11, the release strap 20 will now be described in greater detail. The release strap 20 is formed of a single, elongated piece of material, preferably a single piece of flexible material, specifically a woven fabric. The single piece of material, which forms the release strap 20, includes a first end 30 and a second end 32. As seen in FIG. 7, the single piece of material is folded such that the first end 30 and the second end 32 overlap forming an attachment end 40 and a loop 38 at an opposite end. Referring to FIG. 9, the single piece of material is now two layers thick and includes a first end portion or a top strap 34 which overlies a second end portion or a bottom strap 36.

As seen in FIGS. 8 and 9, the release strap 20 includes a gripping portion 42 and an attachment portion 44. The gripping portion 42 includes the loop 38 and the portion of the release strap 20 adjacent the loop 38. The attachment portion 44 includes the attachment end 40 and the portion of the release strap 20 adjacent the attachment end, including the portion which extends through the slot 24 of the shield 26. The attachment end 40 has an aperture 52 which is used to fixedly secure the attachment end 40 of the release strap 20 to the release mechanism 22 by a fastener, or by any known means of attaching one object to another.

A reinforcement member 46 is positioned between the top strap 34 and the bottom strap 36 of the gripping portion 42 to provide rigidity to the gripping portion 42. The rigidity provided by the reinforcement member 46 allows a portion of the gripping portion 42, specifically the portion adjacent the loop 38, to avoid flexing, or bending. The reinforcement member 46 is formed of a plastic material having a thickness of 1 millimeter.

The top strap 34 is secured to the bottom strap 36 by connections 48 made in the gripping portion 42 and in the attachment portion 44. The connection 48 in the gripping portion 42 secures the top strap 34, the reinforcement member 46, and the bottom strap 36 together, while the connection 48 in the attachment portion 44 secures the top strap 34 to the bottom strap 36. In the illustrated embodiment, the connections 48 are shown as boxed X-shaped stitches; however, it is appreciated, of course, that the connections 48 may be made in any known manner to fixedly secure one object to another, illustratively including staples, adhesives, rivets, and heat bonding.

In order to raise the actuation point of the release strap 20, the single piece of material is folded again to form an overlapping portion 50 formed by overlapping a portion of the attachment portion 44 and a portion of the gripping portion 42 to present the gripping portion in an upward direction. Specifically, the top strap 34 of the gripping portion 42 is folded over to contact the top strap 34 of the attachment portion 44 to form an overlapping portion 50.

The overlapping portion 50 is connected by a connection 48, located between the connection 48 of the gripping portion 42 and the connection 48 attachment portion 44, and which passes through the bottom strap 36 and top strap 34 of the attachment portion, the top strap 34, the reinforcement member 46, and the bottom strap 36 of the gripping portion 42. The reinforcement member 46 provides structural rigidity to the gripping portion 42 such that the loop 38 does not droop downwardly, thereby raising the actuation point of the release strap 20 out of the exit path of the occupant.

A bulb portion 54 is formed adjacent the connection 48 of the overlapping portion 50, and is formed of overlapping yet unsecured portions of the gripping portion 42 and the attachment portion 44. The bulb portion 54 is advantageous to the release strap 20 as it is useful in absorbing tolerances arising during both the forming and the actuation of the release strap 20.

Figure 5:
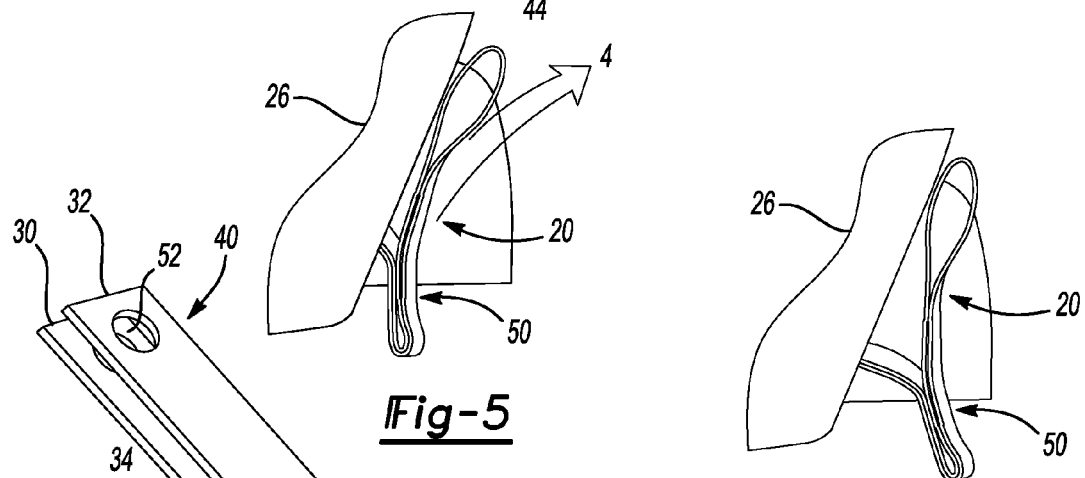
FIG. 5 is a side elevational view of the inventive release strap when the seat back is in the seated position.
Figure 6:
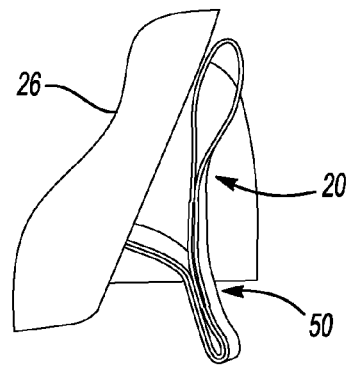
FIG. 6 is a side elevational view of the inventive release strap when the seat back is in the stowed position.

Referring to FIG. 5, the actuation point of the release strap 20 has been raised due to the overlapping portion 50 which presents the gripping portion 42 in an upward direction. Further, the reinforcement member 46 provides sufficient rigidity to the release strap 20 such that the gripping portion 42 and the loop 38 are self supporting. As such, the loop 38 is raised higher than the slot 24 of the shield 26 allowing an occupant to actuate the release strap 20 in the direction of Arrow 4 at a higher point, even when the occupant lacks sufficient room to lean forward. In addition, the loop 38 is raised above the exit path of the occupant when the release mechanism 22 has been actuated and the seat back 18 is in the stowed position, as seen in FIG. 6.

The invention has been described in an illustrative manner. It is therefore to be understood that the terminology used is intended to be in the nature of words of description rather than of limitation. Many modifications and variations of the invention are possible in light of the above teachings. Thus, within the scope of the appended claims the invention may be practiced other than as specifically described.

It is claimed:

1. A release strap for actuating a release mechanism of a seat assembly in an automotive vehicle, the release mechanism being capable of moving a seat back from a seated position to a stowed position, said release strap comprising:
   a continuous flexible member having a first end portion and a second end portion, said first end portion overlaying said second end portion to form a dual layered attachment portion and a dual layered gripping portion;
   said attachment portion having a portion thereof capable of being fixedly secured to the release mechanism, and said gripping portion having a loop of unsecured portions of said first end portion and said second end portion;
   wherein said strap is folded such that a surface of said dual layered attachment portion contacts a surface of said dual layered gripping portion to form an overlapping portion which is fixedly secured at a first location so as to present said gripping portion in an upward direction.

2. The release strap of claim 1, wherein said release strap includes a bulb portion located adjacent said first location, said bulb portion being an unsecured portion of said overlapping portion.

3. The release strap of claim 1, wherein a reinforcement member is positioned between said first end portion and said second end portion of said dual layered gripping portion.

4. The release strap of claim 3, wherein the reinforcement member provides rigidity to said gripping portion to present said loop in said upward direction.

5. The release strap of claim 4, wherein a portion of said overlapping portion and a portion of said reinforcement member are fixedly secured at said first location.

6. The release strap of claim 5, wherein said release strap includes a bulb portion located adjacent said first location, said bulb portion being an unsecured portion of said overlapping portion.

7. The release strap of claim 6, wherein said first end portion and second end portion of said attachment portion are fixedly secured at a second location.

8. The release strap of claim 7, wherein said first end portion and said second end portion are fixedly secured at said second location by stitches.

9. The release strap of claim 8, wherein said stitches at said second location define a boxed X-shape.

10. The release strap of claim 8, wherein said overlapping portion is fixedly secured at said first location by stitches.

11. The release strap of claim 10, wherein said stitches at said first location define a boxed X-shape.

12. The release strap of claim 7, wherein said first end portion, said reinforcement member, and said second end portion are fixedly secured at a third location.

13. The release strap of claim 12, wherein said first location is disposed between said second location and said third location.

14. The release strap of claim 12, wherein said first end portion, said reinforcement member, and said second end portion are fixedly secured at said third location by stitches.

15. The release strap of claim 14, wherein said stitches at said third location define a boxed X-shape.

* * * * *